United States Patent
Baum

(10) Patent No.: US 8,973,983 B2
(45) Date of Patent: Mar. 10, 2015

(54) UNDERBODY GUARD FOR MOTOR VEHICLES

(71) Applicant: Dr. Ing. h.c. F. Porsche Aktiengesellschaft, Stuttgart (DE)

(72) Inventor: Michael Baum, Tiefenbronn-Lehningen (DE)

(73) Assignee: Dr. Ing h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/845,260

(22) Filed: Mar. 18, 2013

(65) Prior Publication Data

US 2013/0249247 A1  Sep. 26, 2013

(30) Foreign Application Priority Data

Mar. 22, 2012  (DE) .......... 10 2012 102 437

(51) Int. Cl.
*B62D 25/20* (2006.01)
*B60R 13/08* (2006.01)

(52) U.S. Cl.
CPC ............ *B62D 25/20* (2013.01); *B60R 13/0861* (2013.01)
USPC ....................................................... 296/204

(58) Field of Classification Search
CPC ......... B62D 25/20; B62D 35/02; B62D 39/00
USPC .................... 296/191, 204, 193.11
See application file for complete search history.

(56) References Cited

U.S. PATENT DOCUMENTS

| 3,873,998 | A | * | 4/1975 | Norris et al. .................. 2/2.5 |
| 4,496,024 | A | * | 1/1985 | Wolf et al. .................. 181/292 |
| 4,782,913 | A | | 11/1988 | Hoffmann et al. |
| 6,249,256 | B1 | * | 6/2001 | Luxon et al. .................. 343/702 |
| 7,532,957 | B2 | | 5/2009 | Kuchler |
| 7,625,037 | B2 | | 12/2009 | Gollehur et al. |
| 8,383,231 | B2 | * | 2/2013 | Horigome et al. ............ 428/212 |
| 2004/0096628 | A1 | * | 5/2004 | Saathoff et al. ............... 428/174 |
| 2006/0103171 | A1 | * | 5/2006 | Blomeling et al. .......... 296/204 |
| 2008/0054597 | A1 | * | 3/2008 | Becker ....................... 280/304.3 |

FOREIGN PATENT DOCUMENTS

| DE | 36 15 360 A1 | | 11/1987 |
| DE | 19521632 | * | 12/1996 |
| DE | 195 21 593 C1 | | 1/1997 |
| DE | 195 28 874 A1 | | 2/1997 |
| DE | 697 10 855 T2 | | 9/2002 |
| DE | 10 2004 026 035 A1 | | 12/2005 |
| DE | 10 2006 043 981 A1 | | 5/2007 |
| JP | 2011-61576 | * | 3/2011 |
| WO | WO2010/050060 | * | 10/2008 |

* cited by examiner

*Primary Examiner* — Dennis H Pedder
(74) *Attorney, Agent, or Firm* — Leydig, Voit & Mayer, Ltd.

(57) ABSTRACT

An underbody guard is mountable under an underbody of a motor vehicle for extensive covering of regions at risk including at least one of an engine, a transmission unit, an axle, a differential, a gas tank, an exhaust system, or sills. The underbody guard including a recess and a dimensionally stable shaped part configured to be inserted into the recess so as to substantially close the recess. The dimensionally stable shaped part is made from materials that do not block radio signals.

8 Claims, 2 Drawing Sheets

UNDERBODY GUARD FOR MOTOR VEHICLES

CROSS REFERENCE TO RELATED APPLICATIONS

This application claims priority to German Patent Application No. DE 10 2012 102 437.5, filed Mar. 22, 2012, which is hereby incorporated by reference herein in its entirety.

FIELD

The invention relates to an underbody guard which is mountable under the underbody of a motor vehicle, in particular a motor vehicle suitable for off road use, for extensive covering of regions at risk, such as the engine and transmission unit, the axle and differential regions, the gas tank and exhaust systems, and the sills, etc.

BACKGROUND

Such underbody coverings for motor vehicles are known in diverse form from the prior art. They are partly provided to reduce the aerodynamic drag and to protect the underbody of the vehicle from external influences, such as, for example, the impact of stones. In the case of motor vehicles suitable for off road use, the primary objectives are to protect against the impact of stones and for the vehicle to "rest on" uneven ground, rubble, etc. in difficult terrain. Accordingly, the underbody guard or underride guard extensively covering the regions at risk is generally mounted as a metallic substructure in one or more parts under the underbody of a vehicle. It is distinguished by its robust construction and relatively high degree of rigidity.

However, an underbody guard of this type, because of its generally metallic and extensive design, inevitably also covers regions in which signals emitted by sensors are intended to be transmitted to the antennae which are assigned to said signals and are arranged in the protected region. This applies in particular—but not exclusively—to the wheel sensors and the receiving antenna of the tire pressure monitoring system.

SUMMARY

In an embodiment, the present invention provides an underbody guard that is mountable under an underbody of a motor vehicle for extensive covering of regions at risk including at least one of an engine, a transmission unit, an axle, a differential, a gas tank, an exhaust system, or sills. The underbody guard including a recess and a dimensionally stable shaped part configured to be inserted into the recess so as to substantially close the recess. The dimensionally stable shaped part is made from a material that does not block radio signals.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention is to improve the underbody guard, without impairing the protective effect of the latter, in such a manner that signals can be transmitted without interference.

This is achieved by one or more recesses which are provided in the underbody guard and into which dimensionally stable shaped parts which close said recesses and are made from materials which do not block radio signals are insertable.

Said shaped parts are preferably designed in the form of plastics parts which are reinforced with glass fiber fabric, are constructed in the manner of a sandwich and are constructed as a single part from a top plate and a base plate with a honeycomb or meandering structure arranged in a stiffening manner in between. The shaped parts are simply inserted into the recess in a form-fitting manner. A frictional fixing of the shaped parts in the recesses is likewise conceivable. Preferably, said shaped parts can be fastened by clipping in; a connection by clipping and bolting or else simply a bolted connection by itself is also conceivable as a means of securely fixing the shaped part in the recess. However, it is also conceivable for the shaped parts to be adhesively bonded or riveted into the recesses.

The shaped part which is ideally produced as a single part and has a construction consisting of honeycombs or meanders arranged between two surfaces is preferably formed with a glass fiber fabric portion of an order of magnitude of approximately 20% to approximately at maximum 30%.

For the satisfactory function, for example, of the tire pressure monitoring system of a vehicle provided with such an underbody guard, the recesses are preferably provided in the region of the wheel houses in a manner directly assigned to the corresponding receiving antenna.

For weight reasons, such an underbody guard should be produced from light metal or from light metal alloys.

A particularly advantageous feature of the subject matter of the invention is that, by means of the dimensionally stable shaped parts made from glass fiber reinforced plastic, which are arranged anchored fixedly in the actual underbody guard or in recesses therein without substantially impairing the stability of said underbody guard, firstly the optimum protective effect against external influences is achieved, as desired, and, secondly, the satisfactory functioning of the transmission of signals is in no way impaired by the underbody guard.

Figure 1:
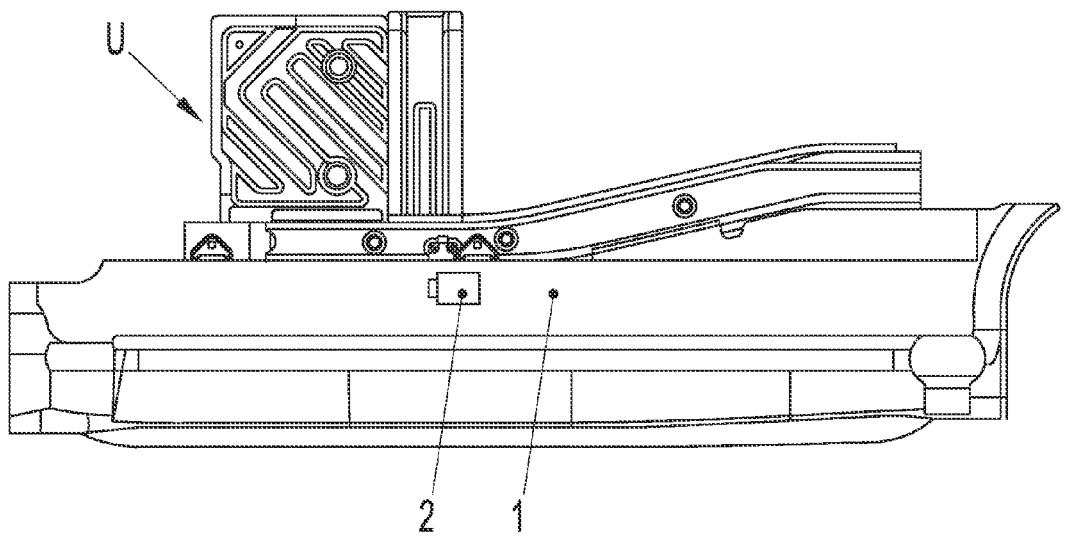
FIG. 1 shows a partial view of the front end of a motor vehicle with an underbody guard according to the invention.

A part of an extensive underbody guard for a motor vehicle that is made, for example, of aluminum or an aluminum alloy is illustrated at 1 in FIG. 1. Said part of the underbody guard 1 is bolted or riveted in a well known manner to the underbody U of the motor vehicle. The underbody guard part 1 has a recess 2. Said recess is arranged in the underbody guard part 1 in such a manner that it does not impair a transmission of signals, for example from the wheel electronics/wheel sensors of a tire pressure monitoring system to the corresponding antenna 4 which is arranged in the protected region above the underbody guard 1.

A shaped part 3 (see FIG. 2) is inserted into the recess 2—in a manner substantially closing the recess 2 so as to fully obtain the protective effect of the underbody guard—and fastened there. Said fastening of the shaped part 3 in the recess 2 can be undertaken in a form-fitting or frictional manner, by clipping in, bolting, adhesive bonding or riveting. It should always be securely mounted in order to obtain the sought protective effect of the entire underbody guard.

Figure 2:
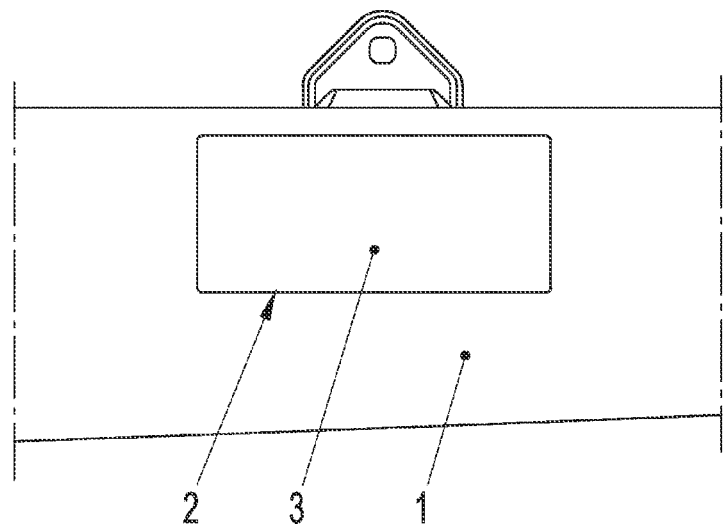
FIG. 2 shows a partial view of an underbody guard according to the invention with a shaped part inserted into a recess in the underbody guard.
Figure 3:
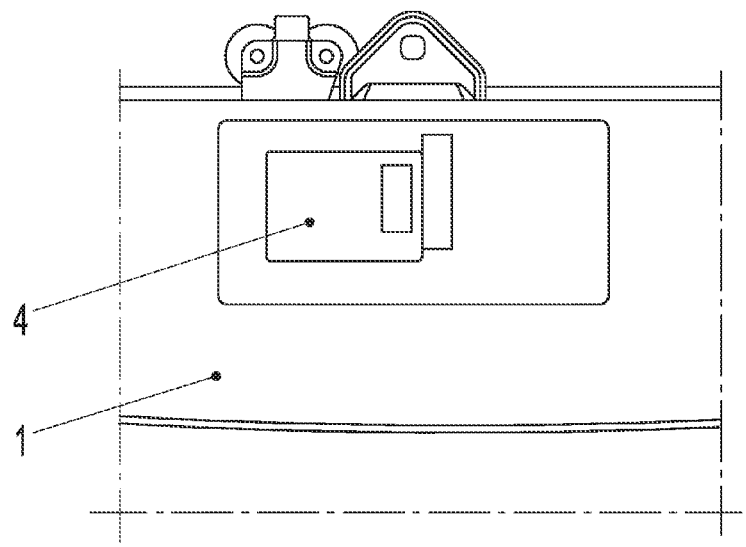
FIG. 3 shows the partial view of the underbody guard according to FIG. 2 without an inserted shaped part and with the receiving antenna, for example for wheel sensor signals, arranged in the protected region above the underbody guard.

For better understanding of the solution according to the invention, FIG. 3 shows the underbody guard 1 according to FIGS. 1 and 2 and the recess 2 without an inserted shaped part 3 together with the receiving antenna 4, which is assigned to the recess, for example for the signals from the wheel sensors of the tire pressure measuring system.

Figure 4:
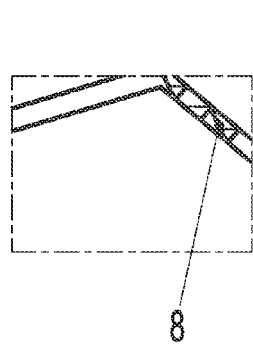
FIGS. 4, 5 and 6 show views of the construction of a dimensionally stable shaped part in the form of a sandwich design with a honeycomb structure (FIG. 5) and meandering structure (FIG. 4).
Figure 5:
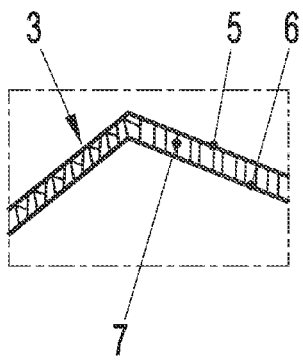
Figure 6:
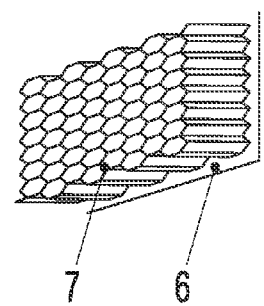

FIGS. 4, 5 and 6 show examples of the dimensionally stable construction of the shaped part 3. Said shaped part 3 which is preferably produced as a single part substantially consists of a top plate and base plate (5 and 6) between which either honeycomb-like structures 7 or meandering structures 8 are arranged in a manner integrally connecting the plates.

The shaped part 3 is preferably formed integrally from glass fiber reinforced plastic with a glass fiber fabric portion of approximately at least 20% to approximately at maximum 30%.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. An metallic underbody guard that is mountable under an underbody of a motor vehicle for extensive covering of regions at risk including at least one of an engine, a transmission unit, an axle, a differential, a gas tank, an exhaust system, or sills, the underbody guard comprising:
   a recess arranged in the underbody guard in a region of a wheel house of the motor vehicle in a manner facing a receiving antenna or antennae of a tire pressure monitoring system; and
   a dimensionally stable shaped part configured to be inserted into the recess so as to substantially close the recess, the dimensionally stable shaped part being made from a material that does not block radio signals and including a plastics part reinforced with glass fiber fabric.

2. The underbody guard recited in claim 1, wherein the underbody guard is configured for use with a motor vehicle suitable for off road use.

3. The underbody guard recited in claim 1, further comprising an additional recess and a corresponding additional dimensionally stable shaped part configured to be inserted into the additional recess so as to substantially close the additional recess.

4. The underbody guard as recited in claim 1, wherein the shaped part includes a sandwich structure including a top plate and a base plate with a honeycomb structure located between the top plate and the base plate.

5. The underbody guard as recited in claim 1, wherein the shaped part includes a sandwich structure including a top plate and a base plate with a meandering structure located between the top plate and the base plate.

6. The underbody guard as recited in claim 1, wherein the shaped part is insertable into the recess in a form-fitting manner.

7. The underbody guard as recited in claim 1, wherein the shaped part is insertable into the recess in a frictional manner.

8. The underbody guard as recited in claim 1, wherein the shaped part is adhesively bonded into the recess.

\* \* \* \* \*